(12) United States Patent
Kumabe et al.

(10) Patent No.: US 8,855,833 B2
(45) Date of Patent: Oct. 7, 2014

(54) VEHICLE DYNAMIC CONTROL PLATFORM BETWEEN APPLICATION AND CONTROLLED OBJECT

(75) Inventors: Hajime Kumabe, Kariya (JP); Yoshihisa Ogata, Chiryu (JP); Junpei Tatsukawa, Chiryu (JP); Mitsuhiro Tokimasa, Obu (JP); Yasuhiko Mukai, Anjo (JP); Masatoshi Hanzawa, Kariya (JP); Masaki Maruyama, Nagoya (JP); Hirofumi Nitta, Obu (JP); Yuichi Mizutani, Aichi-ken (JP)

(73) Assignees: Denso Corporation, Kariya (JP); Advics Co., Ltd, Kariya (JP); Aisin Seiki Kabushiki Kaisha, Kariya (JP)

( * ) Notice: Subject to any disclaimer, the term of this patent is extended or adjusted under 35 U.S.C. 154(b) by 55 days.

(21) Appl. No.: 13/282,626

(22) Filed: Oct. 27, 2011

(65) Prior Publication Data

US 2012/0109414 A1 May 3, 2012

(30) Foreign Application Priority Data

Oct. 29, 2010 (JP) .................. 2010-244534

(51) Int. Cl.
*B60W 50/00* (2006.01)
*B60W 30/02* (2012.01)
*B60W 10/20* (2006.01)
*B60W 10/18* (2012.01)
*B60W 50/04* (2006.01)
*B60W 10/00* (2006.01)
*B60W 50/14* (2012.01)
*B60W 50/035* (2012.01)

(52) U.S. Cl.
CPC ............. *B60W 50/045* (2013.01); *B60W 30/02* (2013.01); *B60W 2050/0095* (2013.01); *B60W 50/14* (2013.01); *B60W 50/035* (2013.01)
USPC ................................................ 701/1; 701/41

(58) Field of Classification Search
CPC .............. B60W 30/02; B60W 50/035; B60W 2050/0095
USPC ............... 701/1, 2, 22, 36, 41, 70, 79, 83, 96, 701/110, 115, 121, 29.1, 29.2, 29.7–34.4
See application file for complete search history.

(56) References Cited

U.S. PATENT DOCUMENTS 7,162,333 B2  1/2007 Koibuchi et al.
2002/0026270 A1* 2/2002 Kurishige et al. ............... 701/41

(Continued)

FOREIGN PATENT DOCUMENTS

JP    63-182709    7/1988
JP    63-271540    11/1988

(Continued)

OTHER PUBLICATIONS

Office Action issued Oct. 8, 2013 in co-pending U.S. Appl. No. 13/282,601.

(Continued)

*Primary Examiner* — Helal A Algahaim
*Assistant Examiner* — Charles J Han
(74) *Attorney, Agent, or Firm* — Harness, Dickey & Pierce, PLC (57) ABSTRACT

In a vehicle dynamic control platform arranged between a controlled object and an application, an availability obtainer obtains an availability corresponding to a controllable range of a second parameter of the controlled object, and outputs the availability of the second parameter of the controlled object to the application. The application is programmed to output the target value of the first parameter based on the availability of the second parameter of the controlled object. A comparator compares the target value of the first parameter with the availability of the second parameter when the target value of the first parameter is outputted from the application, and determines, based on a result of the comparison, whether to perform dynamic control of the vehicle by controlling the controlled object.

11 Claims, 5 Drawing Sheets

(56) References Cited

U.S. PATENT DOCUMENTS

| | | |
|---|---|---|
| 2002/0143451 A1 | 10/2002 | Hac et al. |
| 2004/0083043 A1* | 4/2004 | Akiyama et al. ............... 701/48 |
| 2004/0128044 A1 | 7/2004 | Hac |
| 2005/0027402 A1 | 2/2005 | Koibuchi et al. |
| 2005/0154506 A1 | 7/2005 | Takamatsu |
| 2005/0171669 A1 | 8/2005 | Sato |
| 2005/0203646 A1* | 9/2005 | Makino et al. ................. 700/79 |
| 2006/0208564 A1* | 9/2006 | Yuda et al. .................... 303/146 |
| 2007/0004553 A1 | 1/2007 | Oikawa et al. |
| 2007/0083315 A1* | 4/2007 | Takamatsu et al. ............. 701/90 |
| 2007/0088484 A1* | 4/2007 | Fujita ............................ 701/93 |
| 2007/0112483 A1* | 5/2007 | Jeong ............................ 701/22 |
| 2007/0138986 A1* | 6/2007 | Kutsuna et al. ............... 318/254 |
| 2010/0241289 A1 | 9/2010 | Sandberg |
| 2011/0144885 A1 | 6/2011 | Ohtsuka et al. |
| 2011/0307152 A1 | 12/2011 | Shono et al. |
| 2012/0109411 A1 | 5/2012 | Tokimasa et al. |
| 2012/0109460 A1 | 5/2012 | Tokimasa et al. |

FOREIGN PATENT DOCUMENTS

| | | |
|---|---|---|
| JP | 06-032242 | 2/1994 |
| JP | 11-031011 | 2/1999 |
| JP | 2003-159966 | 6/2003 |
| JP | 2003-191774 | 7/2003 |
| JP | 2005-161997 | 6/2005 |
| JP | 2005-180344 | 7/2005 |
| JP | 2005-193811 | 7/2005 |
| JP | 2005-219541 | 8/2005 |
| JP | 2005-255037 | 9/2005 |
| JP | 2009-068402 | 4/2009 |
| JP | 4297150 | 4/2009 |
| JP | 2009-137582 | 6/2009 |
| JP | 4455379 | 2/2010 |
| JP | 2010-053705 | 3/2010 |
| JP | 2010-115959 | 5/2010 |
| WO | WO 2010/089848 | 8/2010 |

OTHER PUBLICATIONS

Final Office Action issued Feb. 21, 2014 in co-pending U.S. Appl. No. 13/282,601.

Office Action dated Mar. 18, 2014 in corresponding Japanese Application No. 2010-244534.

Office Action dated Mar. 18, 2014 in corresponding Japanese Application No. 2010-244535.

Office Action dated Mar. 18, 2014 in corresponding Japanese Application No. 2010-244537.

Office Action dated Mar. 19, 2014 in corresponding Chinese Application No. 201110354280.2.

Office Action dated Mar. 25, 2014 in corresponding Japanese Application No. 2010-244536.

* cited by examiner

| | AREA | NOTIFICATION TO APPLICATION | NOTIFICATION TO DRIVER | SITUATION |
|---|---|---|---|---|
| FIRST AREA (1) | EXECUTION | NONE/ EXECUTION | NONE/ EXECUTION | FIRST SITUATION |
| SECOND AREA (2) | EXECUTION | EXECUTION WITH CAUTION | EXECUTION WITH CAUTION | SECOND SITUATION |
| THIRD AREA (3) | DISABLING | DISABLING | DISABLING | THIRD SITUATION |

VEHICLE DYNAMIC CONTROL PLATFORM BETWEEN APPLICATION AND CONTROLLED OBJECT

CROSS REFERENCE TO RELATED APPLICATIONS

This application is based on Japanese Patent Application 2010-244534 filed on Oct. 29, 2010. This application claims the benefit of priority from the Japanese Patent Application, so that the descriptions of which are all incorporated herein by reference.

TECHNICAL FIELD

The present disclosure relates to vehicle dynamic control platforms between an application for dynamic control of a vehicle and a controlled object. More particularly, the present disclosure relates to such vehicle dynamic control platforms designed to control, based on a target value associated with dynamic control of the vehicle, the controlled object to perform dynamic control of the vehicle.

BACKGROUND

A typical vehicle dynamic control system is designed such that one or more applications for vehicle dynamic control are directly operatively connected, via interfaces, with corresponding respective controlled objects for performing vehicle dynamic control, and each application directly controls a corresponding controlled object to perform vehicle dynamic control.

For example, US Patent Application Publication No. 2005/0203646 corresponding to Japanese Patent Application Publication No. 2005-255037 discloses a system including an electronic control unit (ECU) for vehicles; the ECU is installed with a lane-keeping application for keeping a vehicle within a lane on which the vehicle is running. The system includes a steering control ECU for steering control, and a brake control ECU for brake control, with which the lane-keeping application is directly operatively connected. When launched, the lane-keeping application is programmed to directly input control signals from the ECU to each of the steering control ECU and the brake control ECU. The steering control ECU and the brake control ECU respectively drive an electronically controlled power-assisted steering actuator (EPS ACT) and a brake control ACT based on the control signals to perform dynamic control of the vehicle, thus keeping the vehicle within the lane on which the vehicle is running.

SUMMARY

The typical vehicle dynamic control system set forth above requires direct operative connections between applications for vehicle dynamic control and corresponding controlled objects, and therefore, requires setting of a target value for each application to be used to control a corresponding controlled object. For these reasons, addition and/or removal of applications into and/or from the system require the changing of the control logic of corresponding controlled objects, and/or the changing of corresponding interfaces. In addition, the changing of controlled objects requires the changing of the control logic of corresponding applications, and/or the changing of corresponding interfaces. The changing of applications, controlled objects, and/or interfaces may apply undue burden on users of the system and/or workers for the changing.

In view of the circumstances set forth above, one aspect of the present disclosure seeks to provide vehicle dynamic control systems, which are designed to address at least the problem set forth above.

Specifically, an alternative aspect of the present disclosure aims to provide such vehicle dynamic control systems capable of reducing burden to be applied on users and/or workers even if applications are added into or removed from the vehicle dynamic control systems or controlled objects installed in the vehicle dynamic control systems are changed.

In addition, a further aspect of the present disclosure aims to provide such vehicle dynamic control systems capable of preventing unintentional behaviors of the vehicle even if there is a malfunction in the vehicle dynamic control systems and/or there is a sudden change in the current conditions of the vehicle.

According to one aspect of the present disclosure, there is provided a vehicle dynamic control platform arranged between a controlled object and an application and designed to control the controlled object according to a target value of a first parameter associated with motion of a vehicle as a control request from the application. The vehicle dynamic control platform includes an availability obtainer configured to obtain an availability corresponding to a controllable range of a second parameter of the controlled object, and to output the availability of the second parameter of the controlled object to the application. The application is programmed to output the target value of the first parameter based on the availability of the second parameter of the controlled object. The vehicle dynamic control platform include a comparator configured to compare the target value of the first parameter with the availability of the second parameter when the target value of the first parameter is outputted from the application, and determine, based on a result of the comparison, whether to perform dynamic control of the vehicle by controlling the controlled object.

According to an alternative aspect of the present disclosure, there is provided a vehicle dynamic control system including the vehicle dynamic control platform recited in the one aspect of the present disclosure; a control requester including the application recited in the one aspect of the present disclosure; and the controlled object recited in the one aspect of the present disclosure.

In the present disclosure, the term "availability" means a controllable range. That is, all words and phrases using the "availability" can be replaced with words and phrases using the "controllable range". Similarly, all words and phrases using the "controllable range" can be replaced with words and phrases using the "availability".

The configuration of each of the one aspect and the alternative aspect of the present disclosure compares the target value of the first parameter with the availability (controllable range) of the second parameter when the target value of the first parameter is outputted from the application, and determine, based on a result of the comparison, whether to perform dynamic control of the vehicle by controlling the controlled object. That is, dynamic motion control of the vehicle can be disabled when the target value of the first parameter is beyond the availability (controllable range) of the second parameter caused by at least one of the following factors: operation errors due to software malfunctions in the application and/or the vehicle dynamic control platform itself; an abnormality in the controlled object; and/or a rapid change in current conditions of the vehicle. Thus, it is possible to prevent an abnormal wide behavior of the vehicle caused by at least one of the factors.

Note that the first parameter can be physically identical to the second parameter, or can be physically different from the second parameter.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENT

An embodiment of the present disclosure will be described hereinafter with reference to the accompanying drawings. In the embodiments, like parts between the embodiments, to which like reference characters are assigned, are omitted or simplified in redundant description.

As described above, in the following embodiments, the term "availability" is equivalent to the term "controllable range". Thus, the words and phrases using the term "controllable range" can be replaced with words and phrases using the term "availability".

Figure 1:
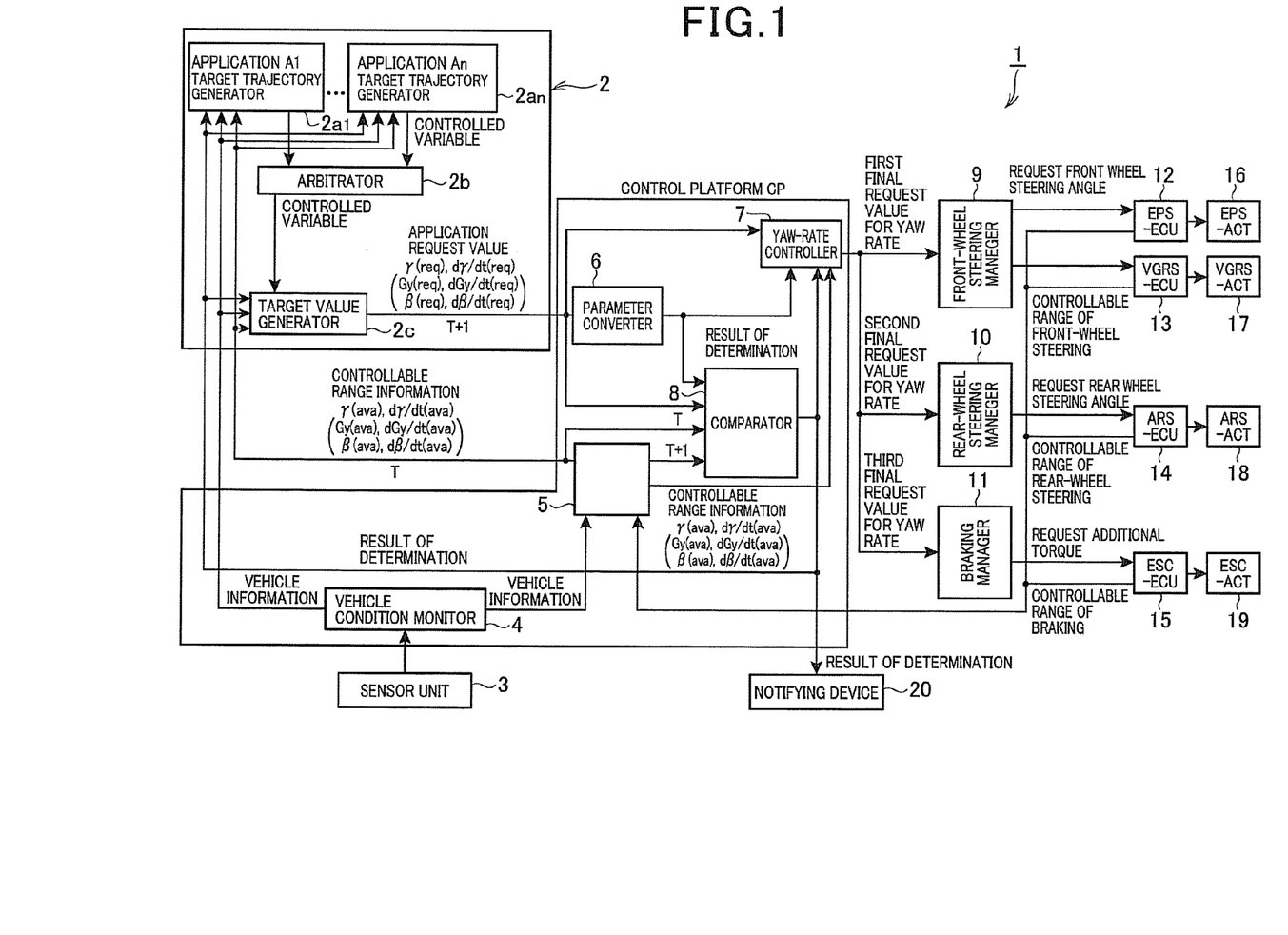
FIG. 1 is a block diagram schematically illustrating an example of the overall structure of a lateral-motion control system according to an embodiment of the present disclosure.

An example of the overall structure of a lateral-motion control system 1 for vehicles according to an embodiment of the present disclosure is disclosed as a block diagram in FIG. 1. The lateral-motion control system 1 according to this embodiment is designed to control lateral motions of a vehicle by controlling a plurality of controlled objects, specifically, front-wheel steering, rear-wheel steering, and braking of the controlled vehicle.

Referring to FIG. 1, the lateral-motion control system 1 includes a control requestor 2, a sensor unit 3, a vehicle condition monitor 4, a controllable range computer 5, a parameter converter 6, a yaw-rate controller 7, a comparator 8, various managers 9 to 11, various electronic control units (ECUs) 12 to 15, various actuators (ACTs) 16 to 19 for controlling lateral motions of the controlled vehicle, and a notifying device 20. For example, the vehicle condition monitor 4, controllable range computer 5, parameter converter 6, yaw-rate controller 7, comparator 8, and/or the managers 9 to 11 constitute a control platform CP of the lateral-motion control system 1.

Note that each of or some of the blocks 2 to 11 included in the lateral-motion control system 1 can be designed as a hardware circuit, a programmed logic circuit, or a hardware and programmed-logic hybrid circuit.

The control requestor 2 is adapted to output, based on the conditions of the controlled vehicle, request signals associated with lateral motions of the controlled vehicle in accordance with a control request (application request) of each of a variety of applications (application programs) A1 to An that carries out a corresponding routine of the lateral-motion control of the controlled vehicle; these applications are installed in the control requestor 1. Specifically, the control requester 1 is comprised of a plurality of target trajectory generators $2a1$ to $2an$ respectively included in, for example, the applications A1 to An, a target trajectory arbitrator $2b$, and a target value generator $2c$.

Each of the target trajectory generators $2a1$ to $2an$ is adapted to generate a target trajectory of a target, that is, the controlled vehicle for a corresponding application based on a control request generated from a corresponding application. Each of the target trajectory generators $2a1$ to $2an$ is also adapted to output both: at least one controlled variable in the lateral direction of the vehicle required to achieve the target trajectory for a corresponding application, and a request signal for instructing execution of a corresponding application. To each application, controllable range information is inputted from the controllable range computer 5 described later. Each application is programmed to compute a corresponding at least one controlled variable required to achieve the corresponding target trajectory.

The target trajectory arbitrator $2b$ is adapted to compute an arbitrated target trajectory based on the target trajectories requested from the respective applications A1 to An based on the at least one controlled variable in the lateral direction of the vehicle for each of the applications A1 to An. Then, the target trajectory arbitrator $2b$ is adapted to output an arbitrated value of at least one control parameter required to achieve the arbitrated target trajectory. As the at least one control parameter, various controlled variables and changes of the controlled variables can be used for the target trajectory arbitrator $2b$. For example, for lateral motion control of the controlled vehicle, lateral acceleration Gy (req) and change dGy/dt (req) in the lateral acceleration, yaw rate γ (req) and change dγ/dt (req) in the yaw rate, slip angle β (req) of the body of the controlled vehicle, and change dβ/dt (req) in the slip angle of the body (referred to as a body slip angle). It is possible to desirably select at least one of the controlled variables according to the description of each application and/or a corresponding controlled object for each application.

For example, the control requestor 2 is provided with at least one controller (not shown) for performing the applications A1 to An.

The applications A1 to An according to this embodiment includes including a lane-keeping control application and a lane-departure prevention application.

The lane-keeping application is programmed to: capture an image in front of the controlled vehicle; recognize, based on the captured image, lane markers formed on both sides of a lane of a road on which the controlled vehicle is running; and perform lateral-motion control of the controlled vehicle to keep the controlled vehicle within the lane while the controlled vehicle is running on the lane.

The lane-departure prevention application is programmed to: capture an image in front of the controlled vehicle; recognize, based on the captured image, lane markers formed on both sides of the running lane; perform lateral-motion control of the controlled vehicle to prevent the controlled vehicle from departing from the recognized lane markers while the controlled vehicle is running on the lane; and generates an alarm signal for the driver to prevent the driver from departing the recognized lane markers.

The applications A1 to An can include any applications to perform lateral-motion control of a controlled vehicle. For example, the applications A1 to An can include an emergency avoidance application programmed to pedal. In lateral-motion control of the controlled vehicle to avoid collisions with obstacles located on the lane along the travelling direction of the controlled vehicle. The applications A1 to An also can include a parking assistance application programmed to perform lateral-motion control of the controlled vehicle to guide the controlled vehicle into a desired parking space via an efficient route.

When each application determines that starting conditions of corresponding lateral-motion control are met based on current conditions of the controlled vehicle supplied from the vehicle condition monitor 4 described later, each of the target trajectory generators 2a1 to 2an is adapted to generate a target trajectory of the controlled vehicle for a corresponding application based on a control request generated by a corresponding application. Each of the target trajectory generators 2a1 to 2an is also adapted to output: a value of at least one controlled variable in the lateral direction of the vehicle required to achieve the target trajectory for a corresponding application; or the target trajectory for a corresponding application. Each of the target trajectory generators 2a1 to 2an is further adapted to output a request signal for instructing execution of a corresponding application.

The target trajectory arbitrator 2b is adapted to arbitrate the controlled variables or the target trajectories outputted from the target trajectory generators 2a1 to 2an. A result of the arbitration is inputted to the target value generator 2c.

The arbitration between the controlled variables or the target trajectories outputted from the target trajectory generators 2a1 to 2an can vary depending on the description of at least one application to be executed. For example, the target trajectory arbitrator 2b can be adapted to add values of the same controlled variable required to achieve the target trajectory for each application, and output the added values of the same controlled variable as an arbitrated value of at least one total controlled variable. This can perform lateral-motion control of the controlled vehicle, which meets the requests of all the applications A1 to An.

In addition, if the applications A1 to An are prioritized, the target trajectory attributor 2b can be adapted to output, as an arbitrated target trajectory, the target trajectory for a selected application with the highest priority in the applications A1 to An, or output, as an arbitrated value of at least one controlled variable, a value of at least one controlled variable required to achieve the target trajectory for the selected application with the highest priority. Because the application requests of the respective applications A1 to An represent one of the applications to be performed, the target value generator 3 can easily select, in the applications, one application that is to be performed as the highest application in priority.

The target value generator 2c is adapted to output, based on the arbitrated target trajectory or the arbitrated value for at least one control parameter required to achieve the arbitrated target trajectory, an application request value (a total target value) for at least one control parameter required to achieve the arbitrated target trajectory. As the application request value of at least one control parameter, an absolute quantity of at least one controlled variable and a change in the at least one controlled variable within a preset control cycle of a corresponding application can be used. In other words, each application is programmed to generate and output an application request value of the at least one control parameter every preset control cycle.

In this embodiment, if physical conversion of the application request value of at least one control parameter is preferable for input of the application request value to the control platform CP, the application request value of at least one control parameter can be physically converted into an application request value of the at least one control parameter, which can be preferably inputted to the control platform CP. For example, as described above, as the application request value of the at least one control parameter, a request positive/negative value of the lateral acceleration Gy (req) and a request value of the change dGy/dt (req) in the lateral acceleration, a request positive/negative value of the yaw rate $\gamma$ (req) and a request value of the change d$\gamma$/dt (req) in the yaw rate, a request value of the body slip angle $\beta$ (req), and/or a request value of the change d$\beta$/dt (req) in the body slip angle can be used.

When the application request value of at least one control parameter, which represents the target value for the at least one control parameter is outputted from the control requester 2, it is inputted to the control platform CP, and the ACTs 16 to 19 are driven via the control platform CP and/or the managers 9 to 11 based on the application request value of at least one control parameter, so that lateral motions of the controlled vehicle are controlled according to the request of at least one of the applications.

The sensor unit 3 is adapted to input, to the vehicle condition monitor 4, information indicative of various conditions of the controlled vehicle. Specifically, the sensor unit 3 is adapted to input, to the vehicle condition monitor 4, measured signals and data signals of results of operations as the information indicative of the various conditions of the controlled vehicle; these measured and data signals represent the various conditions of the controlled vehicle.

In this embodiment, the sensor unit 3 is adapted to transfer, to the vehicle condition monitor 4, information associated with front-wheel steering angle, axle torque, rear-wheel steering angle, and vehicle speed. Specifically, the sensor unit 3 includes, for example, steering angle sensors for outputting measured signals each indicative of a current steering angle of a corresponding front or rear wheel, and is adapted to use the measured signals of the steering angle sensors as the information associated with the front-wheel steering angle and rear-wheel steering angle.

The sensor unit 3 includes, for example, a brake ECU installed in the controlled vehicle for calculating currently generated torque of each axle, and is adapted to use the calculated results of the brake ECU as the information associated with the axle torque. The sensor unit 3 includes, for example, a speed sensor for each wheel for outputting a measured signal indicative of the speed of a corresponding wheel, and is adapted to calculate the speed of the controlled vehicle based on the measured signals of the respective speed sensors for the respective wheels, and to use the calculated speed of the controlled vehicle as the information associated with the vehicle speed.

The sensor unit 3 also includes, for example, a yaw rate sensor for outputting a measured signal indicative of the actual yaw rate of the controlled vehicle. The measured signal of the yaw rate sensor or the actual yaw rate calculated based on the measured signal of the yaw rate sensor is transferred from the sensor unit 3 to the yaw-rate computer 7 via the vehicle condition monitor 4. The sensor unit 3 also includes, for example, a section for measuring the friction coefficient ($\mu$) between the tires of the controlled vehicle and the road surface on which the controlled vehicle is running; the friction coefficient will be also referred to as "road-surface $\mu$" hereinafter. For example, because the brake ECU measures the friction coefficient ($\mu$) between the tires of the controlled vehicle and the road surface based on the speed of each wheel, the sensor unit 3 is adapted to transfer, to the vehicle condition monitor 4, the friction coefficient ($\mu$) measured by the brake ECU.

The vehicle condition monitor 4 is operative to obtain vehicle information indicative of the current conditions of the controlled vehicle based on the information indicative of the various conditions of the controlled vehicle from the sensor unit 3, and output the vehicle information to the controlled range computer 5 while monitoring them.

Specifically, the vehicle condition monitor 4 is adapted to obtain currently ideal front-wheel steering angles, currently ideal rear-wheel steering angles, currently ideal front-axle torque, currently ideal rear-axle torque, and a currently ideal speed of the controlled vehicle based on the current front-wheel steering angles, the rear-wheel steering angles, the current front-axle torque, the current rear-axle torque, and the current speed of the controlled vehicle measured by the sensor unit 3. These currently ideal values, which should be ideally generated by the vehicle under the current conditions of the vehicle, can be obtained in accordance with commonly well-known equations based on the current front-wheel steering angles, the rear-wheel steering angles, the current front-axle torque, the current rear-axle torque, and the current speed of the controlled vehicle. In addition, the vehicle condition monitor 4 is also operative to obtain, from the sensor unit 3, the road-surface $\mu$, which represents the running conditions of the road surface, as an item of the vehicle information.

The controllable range computer 5 is designed as, for example, a controllable range obtainer. Specifically, the controllable range computer 5 is adapted to receive controllable range of each of the ACTs 16 to 19 from a corresponding one of the ECUs 12 to 15, and obtain, based on the received controllable range of each of the ACTs 16 to 19, controllable range information associated with controllable range of each of the controlled objects (the front-wheel steering, the rear-wheel steering, and the braking).

The controllable range computer 5 is adapted to compute, based on the obtained controllable range information associated with the controllable range of each of the controlled objects, a total controllable range of all the controlled objects defined as performance limitations to be achieved by the all the controlled objects. The controllable range computer 5 is adapted to limit the controllable range of each of the controlled objects to compute a final controllable range of total lateral-motion control of the controlled vehicle based on the limited controllable range of each of the controlled objects.

The controllable range computer 5 is adapted to transfer, to yaw-rate controller 7 and each application, the controllable range of each of the controlled objects and/or the limited controllable range of each of the controlled objects. The controllable range computer 5 is adapted to supply, to the comparator 8, the total (overall) controllable range of all the controlled objects corresponding to an unlimited controllable range, and the final controllable range of the total lateral-motion control of the controlled vehicle corresponding to a limited controllable range.

Note that the controllable range (availability) of an element means a conceptual term indicative of the controllable range of at least one controlled variable that can be outputted from the structural element. For example, the controllable range (availability) of an element includes the upper limit and/or lower limit of at least one controlled variable that can be outputted from the element, and the upper limit and/or lower limit of the change in the at least one controlled variable; the change in the at least one controlled variable represents responsivity upon the at least one controlled variable is being controlled.

For example, in lateral-motion control of a controlled vehicle, the controllable range of an element includes controllable range of the element in the direction of turning left and controllable range of the element in the direction of turning right. In this embodiment, because the turning direction of the controlled vehicle can be grasped by the direction (sign) of the request lateral acceleration Gy, as the controllable range of an element, any one of the controllable range of the element in right-hand turn of the controlled vehicle and the controllable range of the element in left-hand turn of the controlled vehicle is used in each application.

In the emergency avoidance application, as the controllable range of an element, both the controllable range of the element in right-hand turn of the controlled vehicle and the controllable range of the element in left-hand turn of the controlled vehicle can be used because, in the event of emergency, the controlled vehicle can turn in right-hand direction and in left-hand direction. In lateral motion control of the controlled vehicle, the controllable range of each of the controlled objects can be represented as the controllable range of yaw rate, the controllable range of lateral acceleration, and the controllable range of body slip angle. In this embodiment, the controllable range of each of the controlled objects is represented as the controllable range of at least one control parameter used by a corresponding one of the controlled objects; the at least one control parameter is the same as the at least one control parameter outputted from the target value generator 2c and inputted to the comparator 8.

For example, the controllable range of each of the ACTs 16 to 19 includes the upper limit of at least one controlled variable used by the ACTs 16 to 19, and the upper limit of the responsivity (the rate) of the at least one controlled variable used by the ACTs 16 to 19. The controllable range of each of the controlled objects (the front-wheel steering, the rear-wheel steering, and the braking) includes the upper limit of at least one controlled variable used for controlling each of the controlled objects, and the upper limit of the responsivity (the rate) of the at least one controlled variable used for controlling each of the controlled objects. The controllable range of each of the controlled objects can be obtained based on the controllable ranges of the ACTs 16 to 19. The controllable ranges of the ACTs 16 to 19 are respectively supplied from the corresponding ECUs 12 to 15 to the controllable range computer 5 as maps or the other similar data; these maps represent the conditions of the ACTs 16 to 19.

The total of the controllable ranges of the ACTs 16 and 17, which are designed to control the front-wheel steering, constitutes the controllable range of the front-wheel steering, and the controllable range of the ACT 18 designed to control the rear-wheel steering constitute the controllable range of the rear-wheel steering. Similarly, the controllable range of the ACT 19 designed to control the braking constitutes the controllable range of the braking. For this reason, transfer of the controllable ranges of the ACTs 16 to 19 from the ECUs 12 to 15 to the controllable range computer 5 means transfer of the controllable ranges of the controlled objects to the controllable range computer 5. Thus, FIG. 1 illustrates that the controllable range of the front-wheel steering, the rear-wheel steering, and the braking are inputted to the controllable range computer 5.

Note that the controllable range of the overall (total) lateral-motion control of the controlled vehicle means the total controllable range of at least one controlled variable that can be outputted from the controllable range computer 5 based on the controllable range of each controlled object, the application information, and the vehicle information. Specifically, the controllable range of each of the controlled objects is limited based on the current conditions of the controlled vehicle included in the vehicle information and the like, and the sum of the limited controllable ranges of the respective controlled objects allows the controllable range of the overall lateral-motion control of the controlled vehicle to be computed. As limitation based on the current conditions of the controlled vehicle, limitation based on a low value of the friction coefficient ($\mu$) can be used.

Specifically, when the road surface on which the controlled vehicle is travelling has a low value of the friction coefficient ($\mu$), if lateral motion control in accordance with the unlimited controllable range of each of the controlled objects were performed, the behavior of the controlled vehicle might be unstable. For example, the controlled vehicle might be slipped. In order to prevent such an unstable behavior of the controlled vehicle, limitation on the controllable range of each of the controlled objects based on the value of the road-surface $\mu$ allows the controllable range of the overall lateral-motion control of the controlled vehicle to be computed.

The parameter converter 6 is adapted to convert the application request value of the at least one control parameter (a controlled variable and a change in the controlled variable) into an application request value of at least one physically alternative control parameter suitable for control of the controlled objects. If the at least one control parameter is physically suitable for control of the controlled objects, the conversion process can be omitted.

For example, in this embodiment, yaw rate $\gamma$ (req) and change $d\gamma/dt$ (req) in the yaw rate are used as a controlled variable and a change in the controlled variable suitable for control of the controlled objects. Thus, if the application request values of the yaw rate $\gamma$ (req) and the change $d\gamma/dt$ (req) in the yaw rate are computed by the target value generator 2c, the conversion process can be omitted. If the application request values of the lateral acceleration Gy (req) and the change dGy/dt (req) in the lateral acceleration and the application request values of the body slip angel $\beta$ (req) and the change $d\beta/dt$ (req) in the body slip angle are computed by the target value generator 2c, they are converted into application request values of the yaw rate $\gamma$ (req) and the change $d\gamma/dt$ (req) in the yaw rate in accordance with the following equation [1]:

$$\gamma(req)=Gy(req)/Vx - d\beta/dt(req) \qquad [1]$$

where $\gamma$ (req) represents a converted value of the yaw rate $\gamma$ (req), and Vx represents the current vehicle speed.

The yaw-rate controller 7 is adapted to select at least one of the controlled objects as at least one suitable controlled object for controlling lateral motions of the controlled vehicle, and compute at least one final request value for the at least one control parameter (a controlled variable and a change in the controlled variable) in the at least one selected controlled object. Specifically, the yaw-rate controller 7 is adapted to select at least one of the controlled objects as optimum controlled object for controlling lateral motions of the controlled vehicle according to: the application request value for the at least one control parameter (a controlled variable and a change in the controlled variable) supplied from the parameter converter 6 or the target value generator 2c; and the controllable range information supplied from the controllable range computer 5.

The yaw-rate controller 7 is also adapted to compute a feedforward request value for the at least one control parameter in the at least one selected controlled object. The yaw-rate controller 7 is further adapted to compute a feedback request value for the at least one control parameter in the at least one selected controlled object.

In addition, the yaw-rate controller 7 is adapted to compute a final request value for the at least one control parameter based on the feedforward request value for the corresponding at least one control parameter in the at least one selected controlled object and the feedback request value for the corresponding at least one control parameter in the at least one selected controlled object. For example, the yaw-rate controller 7 is adapted to sum the feedforward request value for the corresponding at least one control parameter in the at least one selected controlled object and the feedback request value for the corresponding at least one control parameter in the at least one selected controlled object, thus computing the final request value for the at least one control parameter in the at least one selected controlled object. For example, the yaw-rate controller 7 is adapted to select at least one of the controlled objects and compute the final request value for the at least one control parameter in the at least one controlled objects each time a control request (application request) occurs when a corresponding at least one application, such as the lane-keeping application, is launched by, for example, the control requester 1.

In this embodiment, the yaw-rate controller 7 selects at least one of the controlled objects for feedforward control according to the controllable-range information; the at least one of the controlled objects for feedforward control can output at least one control parameter (a controlled variable and a change in the controlled variable) that meets the feedforward (F/F) request value for the at least one control parameter. Similarly, the yaw-rate controller 7 selects at least one of the controlled objects for feedback control according to the controllable-range information; the at least one of the controlled objects for feedback control can output at least one control parameter (a controlled variable and a change in the controlled variable) that meets the feedback (F/B) request value for the at least one control parameter.

One or more controlled objects for feedforward control selected by the yaw-rate controller 7 can be the same as one or more controlled objects for feedback control selected by the yaw-rate controller 7 or different therefrom.

In this embodiment, the yaw-rate controller 7 computes at least one modeled value for the at least one selected controlled object based on the controllable-range information supplied from the controllable range computer 5.

Specifically, when controlled objects are selected in the plurality of controlled objects by the yaw-rate controller 7, allocation of the application request value (total target value) for the at least one control parameter to the selected controlled objects is determined. For example, if two controlled objects are selected by the controlled object selector 61 in a method described later, the upper limit of the at least one control parameter (a controlled variable and/or the change in the corresponding controlled variable) is generated as a local application request value allocated to the at least one control parameter in the first controlled object selected first. If the upper limit of the at least one control parameter does not completely satisfy the application request value, the shortage is generated as a local application request value allocated to the at least one control parameter in the second controlled object selected next.

Note that a local application request value allocated to the at least one control parameter in a selected controlled object is different from a modeled value that can be actually generated in the selected controlled object. For this reason, the yaw-rate controller 7 stores therein previously prepared date indicative of the relationship between the variable of application request value for at least one control parameter in each of the controlled objects and the variable of modeled value of the corresponding at least one control parameter in a corresponding one of the controlled objects. Then, the yaw-rate controller 7 obtains a modeled value of at least one control parameter in at least one selected controlled object corresponding to the local application request value for the at least one control parameter.

Then, the yaw-rate controller 7 computes a feedforward request value for the at least one control parameter in the at least one selected controlled object for feedback control based on the difference between the modeled value of the at least one control parameter and the local application request value for the at least one control parameter in the at least one selected controlled object. One of various well-known methods of computing a feedforward request value can be used by the yaw-rate controller 7.

In this embodiment, the at least one control parameter includes the yaw rate $\gamma$ (the absolute quantity of the yaw rate $\gamma$). A feedforward request value for the yaw rate $\gamma$ in the front-wheel steering as the selected controlled object will be represented as a first F/F request value for the front-wheel steering, a feedforward request value for the yaw rate $\gamma$ in the rear-wheel steering as the selected controlled object will be represented as a second F/F request value for the rear-wheel steering, and a feedforward request value for the yaw rate $\gamma$ in the breaking as the selected controlled object will be represented as a third F/F request value for the braking.

In addition, the yaw-rate controller 7 computes a total feedback request value for the at least one control parameter based on the difference between the sum of the modeled values of the at least one control parameter (yaw rate) of the selected controlled objects obtained from the modeled-value computer 62 and the actual yaw rate measured by the sensor unit 3. The yaw-rate controller 7 allocates the total feedback request value to the at least one selected controlled object, thus computing a local feedback request value for the at least one selected controlled object. The local feedback request value for the at least one selected controlled object is outputted from the yaw-rate controller 7 to the respective managers 9 to 11. One of various well-known methods of computing a total feedback request value can be used by the yaw-rate controller 7.

As a result, the F/F request value and the F/B request value for the at least one control parameter in the at least one selected controlled object are computed. Thus, the yaw-rate controller 7 computes the sum of the F/F request value and the F/B request value for the at least one control parameter in the at least one selected controlled object as a final request value for the at least one control parameter in the at least one selected controlled object.

In this embodiment, the at least one control parameter includes the yaw rate $\gamma$ (the absolute quantity of the yaw rate $\gamma$). A feedforward request value for the yaw rate $\gamma$ in the front-wheel steering as the selected controlled object will be represented as a first F/F request value for the front-wheel steering, a feedforward request value for the yaw rate $\gamma$ in the rear-wheel steering as the selected controlled object will be represented as a second F/F request value for the rear-wheel steering, and a feedforward request value for the yaw rate $\gamma$ in the breaking as the selected controlled object will be represented as a third F/F request value for the braking.

Similarly, in this embodiment, a local feedback request value for the yaw rate $\gamma$ in the front-wheel steering as the selected controlled object will be represented as a first F/B request value for the front-wheel steering, a local feedback request value for the yaw rate $\gamma$ in the rear-wheel steering as the selected controlled object will be represented as a second F/B request value for the rear-wheel steering, and a local feedback request value for the yaw rate $\gamma$ in the breaking as the selected controlled object will be represented as a third F/B request value for the braking.

The final request value for the yaw rate for the at least one selected controlled object represents a value of the yaw rate $\gamma$ required to be generated in control of the at least one selected controlled object. For example, the final request value for the yaw rate for at least one selected controlled object can be obtained by calculating the sum of the F/F request value for the yaw rate $\gamma$ and the F/B request value for the yaw rate $\gamma$ for the at least one selected controlled object.

Specifically, the sum of the first F/F request value and the first F/B request value obtains the first final request value for the yaw rate for the front-wheel steering, and the sum of the second F/F request value and the second F/B request value obtains the second final request value for the yaw rate for the rear-wheel steering. Moreover, the sum of the third F/F request value and the third F/B request value obtains the third final request value for the yaw rate for the braking. The final request value for the yaw rate for at least one selected controlled object is transferred to a corresponding manager.

The comparator 8 is adapted to compare an application request value (a total target value) for the at least one control parameter supplied from the target value generator 2c or the parameter converter 6 with the controllable range of the corresponding at least one control parameter supplied from the controllable range computer 5, thus obtaining where the application request value for the at least one control parameter shows in the controllable range of the corresponding at least one control parameter. Then, the comparator 8 is adapted to transmit, to the yaw-rate controller 7, a control signal indicative of whether to perform lateral-motion control of the controlled vehicle, and transmit, to each of the applications A1 to An and the notifying device 20, information indicative of how lateral-motion control of the controlled vehicle is performed, more specifically, whether execution of lateral-motion control of the controlled vehicle is enabled or disabled.

As described above, the controllable range computer 5 is configured to compute the total controllable range of all the controlled objects, and the final controllable range of the total lateral-motion control of the controlled vehicle. Examples of the total controllable range of all the controlled objects and the final controllable range of the total lateral-motion control of the controlled vehicle are illustrated in FIG. 2 as a controllable range A and a controllable range B, and an example of the relationship between the total controllable range of all the controlled objects and the final controllable range of the total lateral-motion control of the controlled vehicle is illustrated in FIG. 3.

Specifically, because the total controllable range of all the controlled objects obtained by the controllable range computer 5 is unlimited by the current conditions of the controlled vehicle and the like, the total controllable range of all the controlled objects is defined as the performance limitations to be achieved by all the controlled objects. For this reason, the total controllable range of all the controlled objects represents the limits of lateral movement of the controlled vehicle obtained without any consideration of the stability of the controlled vehicle.

On the other hand, because the final controllable range of the total lateral-motion control of the controlled vehicle is the sum of the controllable ranges of the respective controlled objects limited by the current conditions of the controlled vehicle and the like, the final controllable range of the total lateral-motion control of the controlled vehicle represents the range of lateral movement of the controlled vehicle; the controlled vehicle within the range is guaranteed to stably run.

Figure 2:
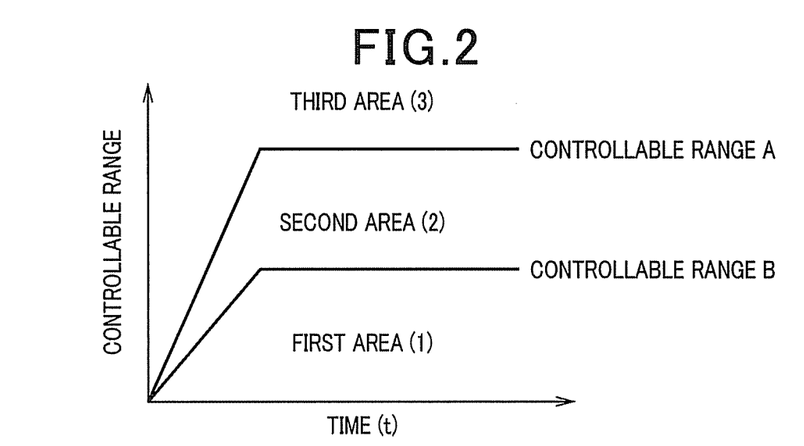
FIG. 2 is a view schematically illustrating examples of a total controllable range of all controlled objects and a final controllable range of the total lateral-motion control of the controlled vehicle.
Figure 3:
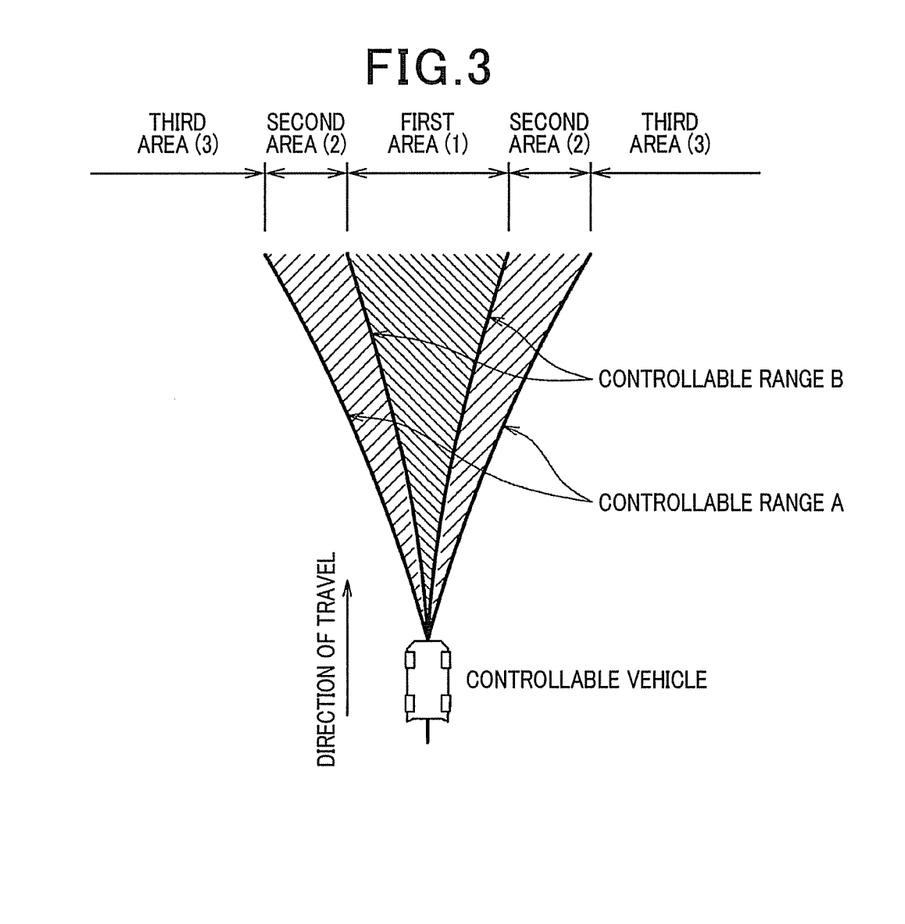
FIG. 3 is a view schematically illustrating an example of a relationship between the total controllable range of all the controlled objects and the final controllable range of the total lateral-motion control of the controlled vehicle.

For these reasons, as illustrated in FIGS. 2 and 3, the controllable range A as the total controllable range of all the controlled objects is wider than the controllable range B as the final controllable range of the total lateral-motion control of the controlled vehicle. Thus, the controllable ranges A and B provide the following first, second, and third areas (1), (2), and (3). Specifically, the first area (1) within the controllable range B represents an area within which the controlled vehicle is guaranteed to stably run, and the second area (2) beyond the controllable range B and within the controllable range A represents the performance limitations of lateral motion of the controlled vehicle to be achieved by all the controlled objects within which the controlled vehicle is not guaranteed to stably run. The third area (3) beyond the controllable range A represents an area within which the controlled vehicle cannot be controlled in performance and stability.

Thus, the comparator 8 is configured to compare an application request value (a total target value) for the at least one control parameter with each of the controllable ranges A and B, and determine whether the application request value (total target value) for the at least one control parameter is within the first area (1), beyond the first area (1) and within the second area (2), or beyond the third area (3). The comparator 8 is also configured to transmit, to the yaw-rate controller 7, a control signal indicative of whether to perform lateral-motion control of the controlled vehicle according to a result of the comparison.

The comparator 8 is further configured to transmit, to each of the applications A1 to An and the notifying device 20, information indicative of how lateral-motion control of the controlled vehicle is performed according to a result of the comparison, more specifically, whether execution of lateral-motion control of the controlled vehicle is enabled or disabled according to a result of the comparison. These configurations of the comparator 8 allow each of the applications A1 to An to generate a control signal according to how lateral-motion control of the controlled vehicle is performed, and allow the notifying device 20 to notify the driver of how lateral-motion control of the controlled vehicle is performed.

Figure 4:
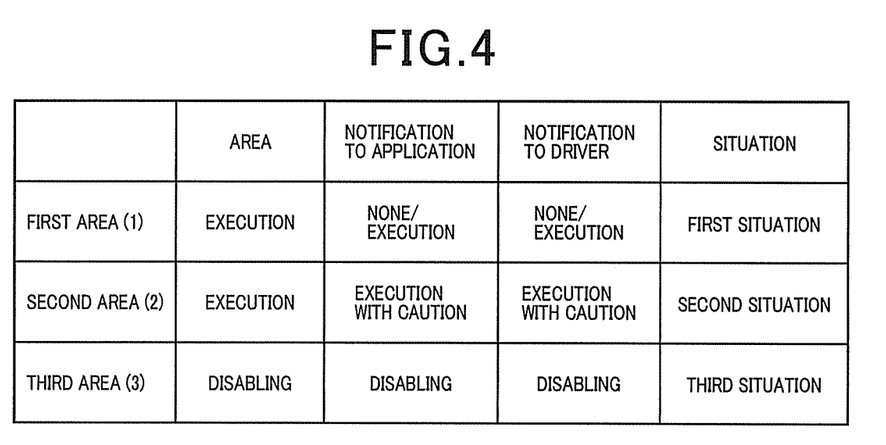
FIG. 4 is a table schematically illustrating pieces of information indicative of, in table format, each of first to third areas (1) to (3) and descriptions of a corresponding control signal; these first to third areas (1) to (3) are defined based on the total controllable range of all the controlled objects and the final controllable range of the total lateral-motion control of the controlled vehicle.

FIG. 4 schematically illustrates pieces of information indicative of in table format, each of the first to third areas (1) to (3) and descriptions of a corresponding control signal.

Referring to FIG. 4, if the application request value (total target value) for the at least one control parameter is within the first area (1), this situation (FIRST SITUATION in FIG. 4) means that each of the controlled objects and the controlled vehicle are stably controlled. In this situation, the comparator 8 transmits, to the yaw-rate controller 7, a control signal to perform lateral motion control of the controlled vehicle. In response to the control signal to perform lateral motion control of the controlled vehicle, the yaw-rate controller 7 transmits, to at least one of the managers 9 to 11 corresponding to at least one selected controlled object, the final request value for the yaw rate, thus fulfilling, via the at least one of the managers 9 to 11 and a corresponding ECU and ACT, the application request value (total target value) for the at least one control parameter.

Simultaneously with the transmission of the control signal to the yaw-rate controller 7, the comparator 8 transmits, to each of the applications A1 to An and the notifying device 20, information representing that lateral-motion control of the controlled vehicle is normally performed. This information causes, based on the controllable range information, each of the applications A1 to An to normally compute, based on the controllable range information, a value for at least one control parameter required to achieve a corresponding target trajectory. This information also causes the notifying device 20 to visibly and/or audibly output information representing that lateral-motion control of the controlled vehicle is normally performed or not to visibly and/or audibly output information associated with abnormal control and/or with the disabling of execution of lateral motion control.

In addition, referring to FIG. 4, if the application request value (total target value) for the at least one control parameter is within the second area (2), this situation (SECOND SITUATION in FIG. 4) means that each of the controlled objects can be controlled in performance, but the behavior of the controlled vehicle may become unstable due to, for example, spinning on the road surface. In this situation, the comparator 8 transmits, to the yaw-rate controller 7, a control signal to perform lateral motion control of the controlled vehicle. In response to the control signal to perform lateral motion control of the controlled vehicle, the yaw-rate controller 7 transmits, to at least one of the managers 9 to 11 corresponding to at least one selected controlled object, the final request value for the yaw rate, thus fulfilling, via the at least one of the managers 9 to 11 and a corresponding ECU and ACT, the application request value (total target value) for the at least one control parameter.

Simultaneously with the transmission of the control signal to the yaw-rate controller 7, the comparator 8 transmits, to each of the applications A1 to An and the notifying device 20, information representing that lateral-motion control of the controlled vehicle is performed with caution. This information causes, based on the controllable range information, each of the applications A1 to An to compute, based on the controllable range information, a value for at least one control parameter required to achieve a corresponding target trajectory, provided that lateral-motion control of the controlled vehicle is performed with caution. This information also causes the notifying device 20 to visibly and/or audibly output information representing that lateral-motion control of the controlled vehicle is performed with caution. If lateral-motion control of the controlled vehicle is performed with caution, each of the target trajectory generators 2a1 to 2an can generate a corresponding target trajectory identical to that computed if lateral-motion control of the controlled vehicle is normally performed, or can change how to compute a corresponding target trajectory according to the descriptions thereof. For example, if an application, such as the emergency avoidance application, places a higher priority on emergency, the application is programmed to place a higher priority on the avoidance of collisions with obstacles rather than on stability. On the other hand, if an application, such as the lane-keeping application, places a higher priority on comfort, it is unnecessary for the application to perform lateral motion control with the failure of stability. Thus, such an application or a corresponding target trajectory generator can be designed to prevent corresponding lateral motion control with caution.

Moreover, referring to FIG. 4, if the application request value (total target value) for the at least one control parameter is within the third area (3), this situation (THIRD SITUATION in FIG. 4) means that each of the controlled objects cannot be controlled according to a corresponding target trajectory due to the performance limitations thereof and/or the current conditions of the controlled vehicle including, for example, a low value of the friction coefficient (μ) or that the behavior of the controlled vehicle becomes unstable due to, for example, spinning on the road surface. In this situation, the comparator 8 transmits, to the yaw-rate controller 7, a control signal to disable lateral motion control of the controlled vehicle, thus disabling the yaw-rate controller 7 to transmit, to at least one of the managers 9 to 11 corresponding to at least one selected controlled object, the final request value for the yaw rate.

Simultaneously with the transmission of the control signal to the yaw-rate controller 7, the comparator 8 transmits, to each of the applications A1 to An and the notifying device 20, infatuation representing that lateral-motion control of the controlled vehicle is disabled. This information causes each of the applications A1 to An not to compute a value for at least one control parameter required to achieve a corresponding target trajectory (or a corresponding target trajectory generator not to compute a corresponding target trajectory). This information also causes the notifying device 20 to visibly and/or audibly output infatuation representing that lateral-motion control of the controlled vehicle is disabled.

As the method of disabling lateral motion control of the controlled vehicle, the comparator 8 transmits, to the yaw-rate controller 7, a control signal, which causes the yaw-rate controller 7 to operate in a limp-home mode to shut down control signals to each manager, and thereafter, prevents transmission of control signals to each manager.

As the method of disabling lateral motion control of the controlled vehicle, if it is determined that the application request value (total target value) for the at least one control parameter is within the third area (3) during a current control cycle of each application, the comparator 8 repeats comparison between the application request value (total target value) for the at least one control parameter used during the precious control cycle of a corresponding application and each of the controllable ranges A and B. If it is determined that the same result of the comparison is continued for a preset time or more, the comparator 8 transmits, to the yaw-rate controller 7, a control signal, which causes the yaw-rate controller 7 to operate in a limp-home mode to shut down control signals to each manager, and thereafter, prevents transmission of control signals to each manager.

As described above, a control signal indicative of whether to perform lateral motion control is transmitted to the yaw-rate controller 7. Thus, the yaw-rate controller 7 transmits, to at least one of the managers 9 to 11 corresponding to at least one selected controlled object, the final request value for the yaw rate if the control signal represents execution of lateral motion control of the controlled vehicle. However, if the control signal represents disabling of lateral motion control of the controlled vehicle, the yaw-rate controller 7 prevents transmission of the final request value for the yaw rate to at least one of the managers 9 to 11 corresponding to at least one selected controlled object.

Each of the managers 9 to 11 is adapted to, when the executive instruction and the final request value for the yaw rate for a corresponding controlled object are inputted, convert the final request value for the yaw rate into a commanded physical value of a predetermined control variable, and supply the commanded physical value of the predetermined control variable to a corresponding one of the ECUs 12 to 15.

Specifically, when the executive instruction and the first final request value for the yaw rate are inputted, the front-wheel steering manager 9 converts the first final request value for the yaw rate into commanded values of the steering angles of the front wheels, and supply the commanded values of the steering angles of the front wheels to the respective ECUs 12 and 13.

When the executive instruction and the second final request value for the yaw rate are inputted, the rear-wheel steering manager 10 converts the second final request value for the yaw rate into commanded values of the steering angles of the rear wheels, and supply the commanded values of the steering angles of the rear wheels to the ECU 14.

When the executive instruction and the third final request value for the yaw rate are inputted, the braking manager 11 converts the third final request value for the yaw rate into a commanded value of the additional torque for each wheel, and supply the commanded value of the additional torque for each wheel to the ECU 15.

In this embodiment, as the ACTs 16 to 19, an electronically controlled power-assisted steering ACT (EPS ACT), that is, a motor, 16, a variable gear ratio steering ACT (VGRS ACT) 17, an active rear steering ACT (ARS ACT) 18, and an electronic stability control ACT (ESC ACT) 19 are used. The EPS ACT 16 is operative to control the steering angles of the front wheels, and the VGRS ACT 17 is also operative to control the steering angles of the front wheels. The ARS ACT 18 is operative to control the steering angles of the rear wheels, and the ESC ACT 19 is operative to brake the individual wheels to keep the controlled vehicle under control.

As described above, the steering angles of the front wheels are controlled by at least one of the EPS ACT 16 and the VGRS ACT 17. That is, a common controlled object is controlled by corresponding different ACTs. Thus, a manager for managing the different ACTs is adapted to arbitrate which of the different ACTs is activated, and/or how to allocate the corresponding final request value for the yaw rate to the different ACTs.

For example, the manager 9 corresponding to the EPS ACT 16 and the VGRS ACT 17 for controlling the steering angles of the front wheels is adapted to arbitrate which of the EPS ACT 16 and the VGRS ACT 17 is activated, and/or how to allocate the first final request value for the yaw rate to the EPS ACT 16 and the VGRS ACT 17. Thereafter, the manager 9 is adapted to supply, based on a result of the arbitration, at least part of the first final request value for the yaw rate to each of the ECUs 12 and 13 corresponding to the EPS ACT 16 and the VGRS ACT 17.

Each of the ECUs 12 to 15 is adapted to output an instruction to a corresponding ACT to instruct the corresponding ACT to implement a corresponding final request value for the yaw rate. Specifically, at least one of the ECUs 12 and 13 is adapted to control at least one of the EPS ACT 16 and the VGRS ACT 17, thus implementing the commanded values of the steering angles of the front wheels. The ECU 14 is adapted to control the ARS ACT 18, thus implementing the commanded values of the steering angles of the rear wheels. The ECU 15 is adapted to control the ESC ACT 19, thus implementing the commanded additional torque for each wheel.

Each of the ECUs 12 to 15 is adapted to grasp the controllable range of each of the ACTs 16 to 19 based on the operating conditions of the ACTs 16 to 19, and to transfer the controllable range of each of the ACTs 16 to 19 to the controllable range computer 5. As described above, the controllable range of the ACTs 16 to 19 includes the controllable range of the front-wheel steering, the controllable range of the rear-wheel steering, and the controllable range of the braking.

The controllable range of the front-wheel steering represents the controllable range of the steering angles of the front wheels to be controlled by the EPS ACT 16 and the VGRS ACT 17. The controllable range of the rear-wheel steering represents the controllable range of the steering angles of the rear wheels to be controlled by the ARS ACT 18. The controllable range of the braking represents the controllable range of the additional torque for each wheel to be controlled by the ESC ACT 19.

Specifically, the controllable range of the front-wheel steering includes the controllable range of the absolute quantity of the steering angle of each front wheel and the controllable range of the angular velocity of the steering angle of each front wheel; the angular velocity of the steering angle of each front wheel represents the change in the steering angle of a corresponding front wheel, and demonstrates the responsivity of the steering angle of a corresponding front wheel.

Similarly, the controllable range of the rear-wheel steering includes the controllable range of the absolute quantity of the steering angle of each rear wheel and the controllable range of the angular velocity of the steering angle of each rear wheel; the angular velocity of the steering angle of each rear wheel represents the change in the steering angle of a corresponding rear wheel, and demonstrates the responsivity of the steering angle of a corresponding rear wheel.

In addition, the controllable range of the braking includes the controllable range of the absolute quantity of the torque of each of the front axle and rear axle and the controllable range of the change in the torque of each of the front axle and rear axle. The change in the torque of each of the front axle and rear axle demonstrates the responsivity of the braking of a corresponding one of the front axle and rear axle.

The lateral-motion control system 1 according to this embodiment has been constructed set forth above.

Specifically, if at least one control parameter required to achieve a target trajectory of the controlled vehicle according to a control request supplied from a corresponding application is inputted from the control requester 2 to the control platform CP of the lateral-motion control system 1, the control platform CP is configured to optimally control one or more controlled objects according to corresponding one or more application request values (total target values) for at least one control parameter. This provides the behavior of the controlled vehicle according to the target trajectory of the controlled vehicle without connection of each application with a corresponding at least one controlled object. Thus, even if a new application is additionally installed in the control requester 2 or an application is removed from the previously installed applications in the control requester 2, it is possible to accommodate the addition or removable of an application by changing the control logic of the platform CP without changing the control logic of each controlled object. Similarly, even if at least one controlled object is changed, it is possible to accommodate the changing of the at least one controlled object by changing the control logic of the platform CP without changing the control logic of each application.

Thus, the configuration of the lateral-motion control system 1 according to this embodiment achieves an advantage reducing burden to be applied on users and/or workers even if applications are added into or removed from the lateral-motion control system 1 or controlled objects installed in the lateral-motion control system 1 are changed.

The control platform CP of the lateral-motion control system 1 is configured to cooperatively control controlled objects to thereby obtain a wide range of lateral motion of the controlled vehicle. For example, the control platform CP of the lateral-motion control system 1 can carry out cooperative control in combination of the front-wheel steering and the braking to thereby generate a value of the yaw rate greater than that of the yaw rate generated when control of the front-wheel steering is only performed.

The lateral-motion control system 1 is configured such that the comparator 8 compares an application request value (a total target value) for at least one control parameter supplied from the target value generator 2c or the parameter converter 6 with the controllable range of the corresponding at least one control parameter supplied from the controllable range computer 5, thus determining whether to perform lateral motion control of the controlled vehicle. That is, lateral motion control of the controlled vehicle can be disabled when the application request value (total target value) for the at least one control parameter is beyond the controllable range of the corresponding at least one control parameter supplied from the controllable range computer 5 caused by at least one of the following factors: operation errors due to software malfunctions in at least one application and/or the control platform CP; an abnormality in at least one of the ACTs 16 to 19; and a rapid change in the current conditions of the controlled vehicle, such as a rapid change in the road-surface μ. Thus, it is possible to prevent an abnormal wide behavior of the controlled vehicle caused by at least one of the factors.

Particularly, the lateral-motion control system 1 is configured such that the controllable range computer 5 transmits the controllable range information (the controllable range of the corresponding at least one control parameter) to each of the applications A1 to An, and each of the applications A1 to An outputs a request of lateral motion control according to the controllable range information. This configuration allows the comparator 8 to compare an application request value (a total target value) for at least one control parameter supplied from the target value generator 2c or the parameter converter 6 with the controllable range of the corresponding at least one control parameter supplied from the controllable range computer 5, making it possible to determine whether the controllable range of the corresponding at least one control parameter is matched with the response of each application based on the controllable range of the corresponding at least one control parameter.

For example, referred to FIG. 1, if an application outputs, according to the controllable range information during a current control cycle T thereof supplied from the controllable range computer 5, an application outputs a request of lateral motion control during the next control cycle T+1, the comparator 8 is configured to compare the controllable range of at least one control parameter with the application request value (total target value) for the corresponding at least one control parameter generated by the application at the next control cycle T+1. This configuration allows the controllable range of at least one control parameter obtained during the current control cycle T of each application is matched with the application request value (total target value) for the corresponding at least one control parameter generated by a corresponding application during the next control cycle T+1.

In addition, the lateral-motion control system 1 can be configured such that the controllable range computer 5 transmits, to the comparator 8, both the controllable range information during a current control cycle T of each application, and the controllable range information during the next control cycle T+1 of each application. This configuration makes it possible to perform lateral motion control of the controlled vehicle to suit ever-changing conditions of the controlled vehicle.

Specifically, if the control cycle of an application is relatively long so that the conditions of the controlled vehicle greatly vary during a current control cycle of the application, it is not preferable to perform lateral motion control based on the controllable range information supplied to the application during the current control cycle. For example, if lateral motion control were performed according to the controllable range information during a current control cycle T of an application with the friction coefficient (μ) between the tires of the controlled vehicle and the road surface on which the controlled vehicle is running rapidly varying from a high value to a low value, the controlled vehicle would be slipped.

Thus, even if the comparator 8 determines that the controllable range of at least one control parameter obtained during the current control cycle T of the application is matched with the application request value (total target value) for the corresponding at least one control parameter generated by the application during the next control cycle T+1, the comparator 8 can be configured to disable lateral motion control of the controlled vehicle when determining that disabling of lateral motion control based on the application request value (total target value) for the corresponding at least one control parameter generated by the application is better in, for example, safety and comfort than execution thereof. This makes it possible to perforin lateral motion control to suit the variations in the conditions of the controlled vehicle.

Figure 5:
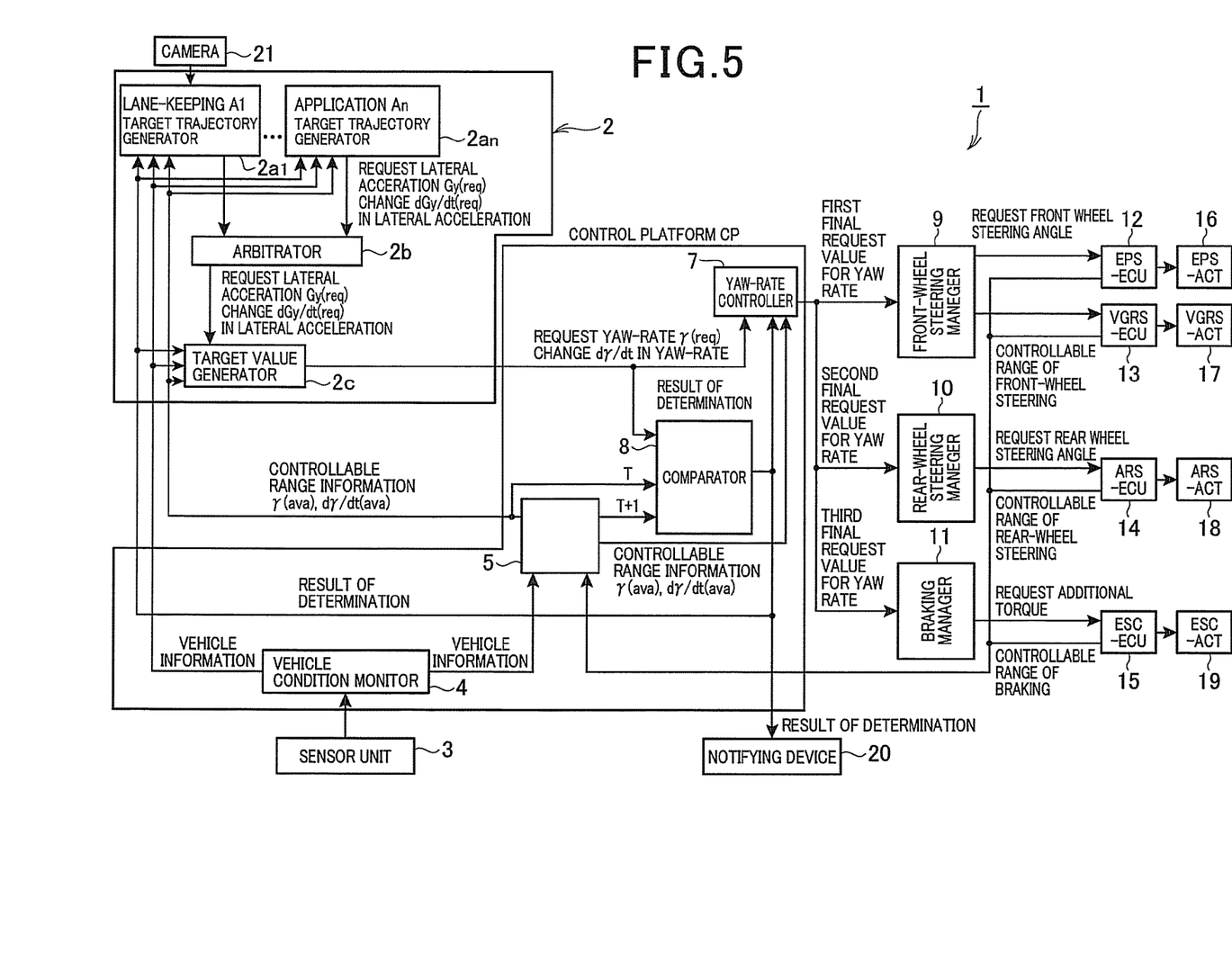
FIG. 5 is a block diagram schematically illustrating an example of the overall structure of a lateral-motion control system according to a first application example of the present disclosure.

Next, a first application example of the present disclosure will be described hereinafter. In the first application example, as the first application A1, the lane-keeping application is used.

FIG. 5 schematically illustrates an example of the overall structure of the lateral-motion control system 1 according to the first application example of the present disclosure. Referring to FIG. 5, an image in front of the controlled vehicle is inputted to the first application A1 (the target trajectory generator 2a1) from a camera. The target trajectory generator 2a1 recognizes, based on the captured image, lane markers formed on both sides of a lane of a road on which the controlled vehicle is running, and generates (computes) a target trajectory of the controlled vehicle required to keep the controlled vehicle within the lane while the controlled vehicle is running on the lane.

Then, the target trajectory generator 2a1 computes, based on the controllable range information, a request value of the lateral acceleration Gy (req) and a request value of the change dGy/dt (req) in the lateral acceleration, which are required to achieve the target trajectory, and outputs the request value of the lateral acceleration Gy (req) and the request value of the change dGy/dt (req) in the lateral acceleration to the target trajectory attributor 2b.

Similarly, a request value of the lateral acceleration Gy (req) and a request value of the change dGy/dt (req) in the lateral acceleration are inputted to the target trajectory attributor 2b from another application. After attribution by the target trajectory attributor 2b between the request values of the lateral acceleration Gy (req) and the request values of the change dGy/dt (req) in the lateral acceleration, a result of the attribution is transferred to the target value generator 2c, and is converted by the target value generator 2c in terms of yaw rate. As a result, a request positive/negative value of the yaw rate γ (req) and a request value of the change dγ/dt (req) in the yaw rate are outputted from the target value generator 2c as the application request value of at least one control parameter.

Because the yaw-rate controller 7 is configured to manipulate physical values in tee ins of yaw rate, the request value of the yaw rate γ (req) and the request value of the change dγ/dt (req) in the yaw rate are inputted to the yaw-rate controller 7 without through the parameter converter 6. At least one controlled object, which corresponds to the request value of the yaw rate γ (req) and the request value of the change dγ/dt (req) in the yaw rate, is selected by the yaw-rate controller 7, so that a final request value for the yaw rate for at least one selected controlled object is computed by the yaw-rate controller 7, and outputted therefrom to the at least one selected control objects. If all the front-wheel steering, the rear-wheel steering, and the braking are selected as the at least one controlled object, the final request value for the yaw rate for each of the front-wheel steering, the rear-wheel steering, and the braking is inputted to a corresponding one of the managers 9 to 11.

The final request value for the yaw rate for each of the front-wheel steering, the rear-wheel steering, and the braking is converted into a commanded physical value of a predetermined control variable by a corresponding one of the managers 9 to 11, and the commanded physical value of the predetermined control variable is supplied from each of the managers 9 to 11 to a corresponding one of the ECUs 12 to 15. Each of the ECUs 12 to 15 drives a corresponding one of the ACTs 16 to 19 based on the corresponding commanded physical value of the predetermined control variable, thus performing lateral motion control of the controlled vehicle according to the requests of the applications A1 to An including the lane-keeping application A1.

The controllable range of each of the controlled objects, that is, each of the ACTs 16 to 19 is supplied to the controllable range computer 5. Specifically, the upper limit of at least one controlled variable used by the ACTs 16 to 19, and the upper limit of the responsivity (the rate) of the at least one controlled variable used by the ACTs 16 to 19 are supplied to the controllable range computer 5. The upper limit of at least one controlled variable used by the ACTs 16 to 19, and the upper limit of the responsivity (the rate) of the at least one controlled variable used by the ACTs 16 to 19 are converted by the controllable range computer 5 in terms of yaw rate into a controllable range of the yaw rate γ (ava) and a controllable range of the change dγ/dt (ava) in the yaw rate γ of each of the controlled objects. Then, the controllable range of the yaw rate γ (ava) and a controllable range of the change dγ/dt (ava) in the yaw rate γ of each of the controlled objects are supplied to the controllable range computer 5.

In the controllable range computer 5, the controllable range of the yaw rate γ (ava) and a controllable range of the change dγ/dt (ava) in the yaw rate γ of each of the controlled objects are limited by the current conditions of the controlled vehicle by the controllable range computer 5, so that the final controllable range of the yaw rate γ and the final controllable range of the change in the yaw rate γ of each of the controlled objects are obtained.

The total controllable range of the yaw rate γ (ava1) and the total controllable range of the change dγ/dt (ava1) in the yaw rate γ of all the controlled objects are computed based on the controllable range of the yaw rate γ (ava) and the controllable range of the change dγ/dt (ava) in the yaw rate γ of each of the controlled objects. The total controllable range of the yaw rate γ (ava) and the total controllable range of the change dγ/dt (ava) in the yaw rate γ of all the controlled objects are unlimited by the current conditions of the controlled vehicle. The final controllable range of the yaw rate γ (ava2) and the final controllable range of the change dγ/dt (ava2) in the yaw rate for the total lateral-motion control of the controlled vehicle are computed based on the final controllable range of the yaw rate γ and the final controllable range of the change in the yaw rate γ of each of the controlled objects.

The total controllable range (A) of the yaw rate γ (ava1) and the total controllable range (A) of the change dγ/dt (ava1) in the yaw rate γ of all the controlled objects, and the final controllable range (B) of the yaw rate γ (ava2) and the final controllable range (B) of the change dγ/dt (ava2) in the yaw rate for the total lateral-motion control of the controlled vehicle are transmitted to the comparator 8 as the controllable range information.

In response to the controllable range information, each application is programmed to output a control request, and the target value generator 2c outputs a request value of the yaw rate γ (req) and a request value of the change dγ/dt (req) in the yaw rate, which are matched with the controllable range information. For this reason, the request value of the yaw rate γ (req) is compared with each of the total controllable range A of the yaw rate γ (ava1) and the final controllable range B of the yaw rate γ (ava2), and the request value of the change dγ/dt (req) in the yaw rate is compared with each of the total controllable range A of the change dγ/dt (ava1) in the yaw rate γ and the final controllable range B of the change dγ/dt (ava2) in the yaw rate.

The comparison determines whether the request value of the yaw rate γ (req) is within one of the first to third areas (1) to (3) defined by the total controllable range A of the yaw rate γ (ava1) and the final controllable range B of the yaw rate γ (ava2) (see FIGS. 2 and 3), and deter mines whether the request value of the change dγ/dt (req) in the yaw rate is within one of the first to third areas (1) to (3) defined by the total controllable range A of the change dγ/dt (ava1) in the yaw rate γ and the final controllable range B of the change dγ/dt (ava2) in the yaw rate (see FIGS. 2 and 3).

This makes it possible to transmit, to the yaw-rate controller 7, a control signal to indicative of whether to pedal ill lateral-motion control of the controlled vehicle according to a result of the comparison, and to transmit, to each of the applications A1 to An and the notifying device 20, infatuation indicative of how lateral-motion control of the controlled vehicle is performed.

Figure 6:
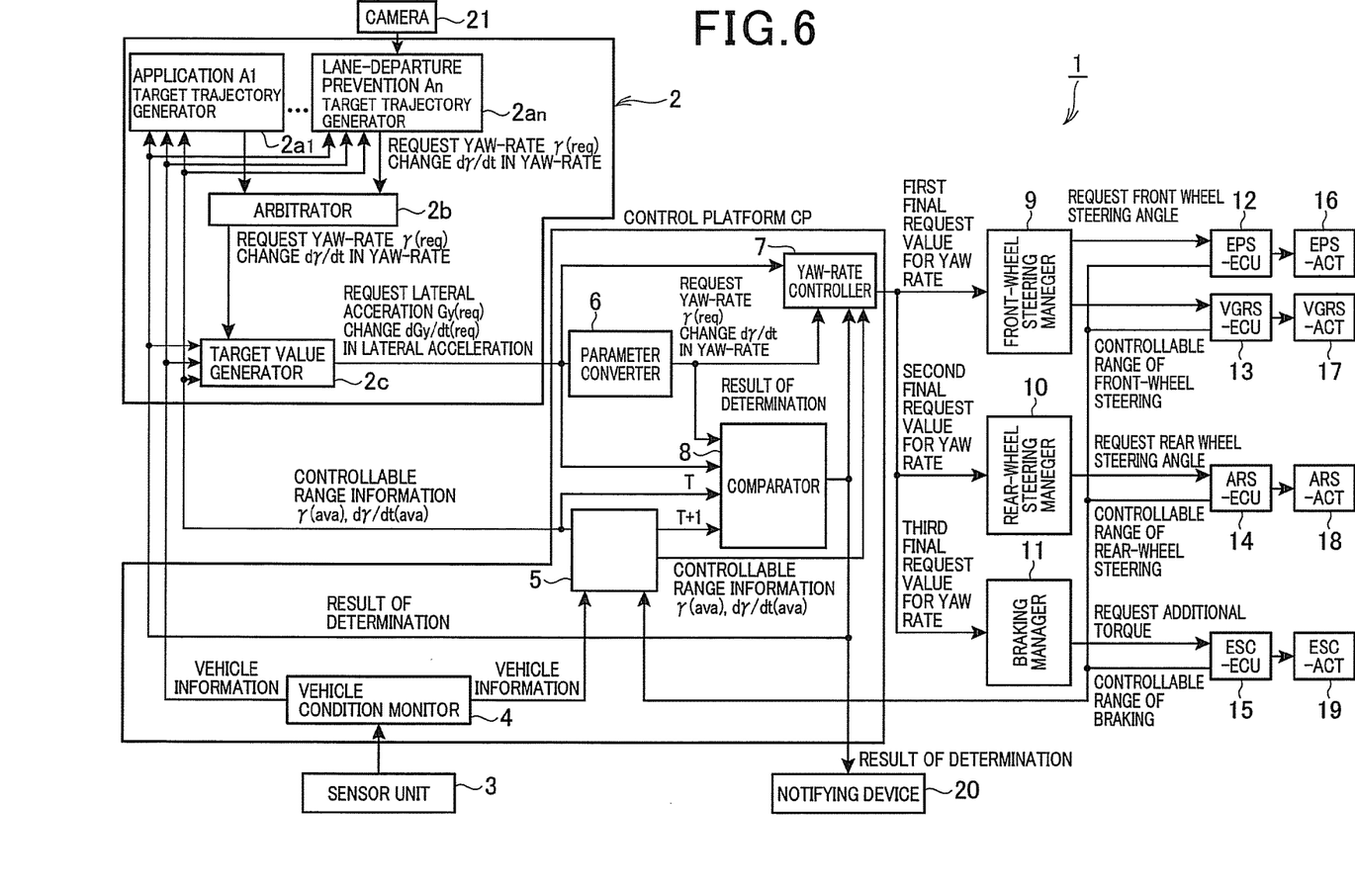
FIG. 6 is a block diagram schematically illustrating an example of the overall structure of a lateral-motion control system according to a second application example of the present disclosure.

Next, a second application example of the present disclosure will be described hereinafter. In the second application example, as the first application An, the lane-departure prevention application is used.

FIG. 6 schematically illustrates an example of the overall structure of the lateral-motion control system 1 according to the second application example of the present disclosure. Referring to FIG. 6, an image in front of the controlled vehicle is inputted to the n-th application An (the target trajectory generator 2an) from a camera. The target trajectory generator 2an recognizes, based on the captured image, lane markers formed on both sides of a lane of a road on which the controlled vehicle is running, generates an alarm signal for the driver to prevent the driver from departing the recognized lane markers, and generates (computes) a target trajectory of the controlled vehicle required to prevent the controlled vehicle from departing from the recognized lane markers.

Then, the target trajectory generator 2an computes, based on the controllable range info illation, a request value of the yaw rate γ (req) and a request value of the change dγ/dt (req) in the yaw rate, which are required to achieve the target trajectory, and outputs the request value of the yaw rate γ (req) and a request value of the change dγ/dt (req) in the yaw rate to the target trajectory attributor 2b.

Similarly, a request value of the request value of the yaw rate γ (req) and a request value of the change dγ/dt (req) in the yaw rate are inputted to the target trajectory attributor 2b from another application. After attribution by the target trajectory attributor 2b between the request values of the yaw rate γ (req) and the request values of the change dγ/dt (req) in the yaw rate, a result of the attribution is transferred to the target value generator 2c, and is converted by the target value generator 2c in terms of lateral acceleration. As a result, a request positive/negative value of the lateral acceleration Gy (req) and the request value of the change dGy/dt (req) in the lateral acceleration are outputted from the target value generator 2c as the application request value of at least one control parameter.

Because the yaw-rate controller 7 is configured to manipulate physical values in terms of yaw rate, the request value of the lateral acceleration Gy (req) and the request value of the change dGy/dt (req) in the lateral acceleration are converted by the parameter converter 6 into a physical values in terms of yaw rate.

For example, assuming that the components β (req) and dβ/dt (req) in the equation [1] are zero, the request value of the lateral acceleration Gy (req) and the request value of the change dGy/dt (req) in the lateral acceleration are converted into a request value of the yaw rate γ (req) and a request values of the change dγ/dt (req) in accordance with the equation "γ (req)=Gy (req)/Vx". A result of the conversion is inputted to the yaw-rate controller 7.

Thereafter, at least one controlled object, which corresponds to the request value of the lateral acceleration Gy (req) and the request value of the change dGy/dt (req) in the lateral acceleration, is selected by the yaw-rate controller 7, so that a final request value for the yaw rate for at least one selected controlled object is computed by the yaw-rate controller 7, and outputted therefrom to the at least one selected control objects. If all the front-wheel steering, the rear-wheel steering, and the braking are selected as the at least one controlled object, the final request value for the yaw rate for each of the front-wheel steering, the rear-wheel steering, and the braking is inputted to a corresponding one of the managers 9 to 11. The final request value for the yaw rate for each of the front-wheel steering, the rear-wheel steering, and the braking is converted into a commanded physical value of a predetermined control variable by a corresponding one of the managers 9 to 11, and the commanded physical value of the predetermined control variable is supplied from each of the managers 9 to 11 to a corresponding one of the ECUs 12 to 15. Each of the ECUs 12 to 15 drives a corresponding one of the ACTs 16 to 19 based on the corresponding commanded physical value of the predetermined control variable, thus performing lateral motion control of the controlled vehicle according to the requests of the applications A1 to An including the lane-departure prevention application An.

The controllable range of each of the controlled objects, that is, each of the ACTs 16 to 19 is supplied to the controllable range computer 5. Specifically, the upper limit of at least one controlled variable used by the ACTs 16 to 19, and the upper limit of the responsivity (the rate) of the at least one controlled variable used by the ACTs 16 to 19 are supplied to the controllable range computer 5. The upper limit of at least one controlled variable used by the ACTs 16 to 19, and the upper limit of the responsivity (the rate) of the at least one controlled variable used by the ACTs 16 to 19 are converted by the controllable range computer 5 in terms of yaw rate into a controllable range of the lateral acceleration Gy (ava) and a controllable range of the change dGy/dt (ava) in the lateral acceleration of each of the controlled objects. Then, the controllable range of the lateral acceleration Gy (ava) and a controllable range of the change dGy/dt (ava) in the lateral acceleration of each of the controlled objects are supplied to the controllable range computer 5.

In the controllable range computer 5, the controllable range of the lateral acceleration Gy (ava) and a controllable range of the change dGy/dt (ava) in the lateral acceleration of each of the controlled objects are limited by the current conditions of the controlled vehicle by the controllable range computer 5, so that the final controllable range of the lateral acceleration Gy (ava) and a controllable range of the change dGy/dt (ava) in the lateral acceleration of each of the controlled objects are obtained.

The total controllable range of the lateral acceleration Gy (ava1) and the total controllable range of the change dGy/dt (ava1) in the lateral acceleration of all the controlled objects are computed based on the controllable range of the lateral acceleration Gy (ava) and a controllable range of the change dGy/dt (ava) in the lateral acceleration of each of the controlled objects. The total controllable range of the lateral acceleration Gy (ava) and a controllable range of the change dGy/dt (ava) in the lateral acceleration of all the controlled objects are unlimited by the current conditions of the controlled vehicle. The final controllable range of the lateral acceleration Gy (ava2) and a controllable range of the change dGy/dt (ava 9) in the lateral acceleration for the total lateral-motion control of the controlled vehicle are computed based on the final controllable range of the lateral acceleration Gy (ava) and a controllable range of the change dGy/dt (ava) in the lateral acceleration of each of the controlled objects.

The total controllable range (A) of the lateral acceleration Gy (ava1) and the total controllable range (A) of the change dGy/dt (ava1) in the lateral acceleration of all the controlled objects, and the final controllable range (B) of the lateral acceleration Gy (ava2) and the final controllable range (B) of the change dGy/dt (ava2) in the lateral acceleration for the total lateral-motion control of the controlled vehicle are transmitted to the comparator 8 as the controllable range information.

In response to the controllable range information, each application is programmed to output a control request, and the target value generator 2c outputs a request value of the lateral acceleration Gy (req) and a request value of the change dGy/dt (req) in the lateral acceleration, which are matched with the controllable range information. For this reason, the request value of the lateral acceleration Gy (req) is compared with each of the total controllable range A of the lateral acceleration Gy (ava1) and the final controllable range B of the lateral acceleration Gy (ava2), and the request value of the change dGy/dt (req) in the lateral acceleration is compared with each of the total controllable range A of the change dGy/dt (ava1) in the lateral acceleration and the final controllable range B of the lateral acceleration Gy (ava2) in the lateral acceleration.

The comparison determines whether the request value of the lateral acceleration Gy (req) is within one of the first to third areas (1) to (3) defined by the total controllable range A of the lateral acceleration Gy (ava1) and the final controllable range B of the lateral acceleration Gy (ava2) (see FIGS. 2 and 3), and determines whether the request value of the change dGy/dt (req) in the lateral acceleration is within one of the first to third areas (1) to (3) defined by the total controllable range A of the change dGy/dt (ava1) in the lateral acceleration and the final controllable range B of the change dGy/dt (ava2) in the lateral acceleration (see FIGS. 2 and 3).

This makes it possible to transmit, to the yaw-rate controller 7, a control signal to indicative of whether to perform lateral-motion control of the controlled vehicle according to a result of the comparison, and to transmit, to each of the applications A1 to An and the notifying device 20, information indicative of how lateral-motion control of the controlled vehicle is performed.

In each of the embodiment and its application examples, the lateral-motion control system 1 for performing lateral-motion control of the controlled vehicle has been described as an example of dynamic control of the controlled vehicle, but the present disclosure can be applied to a dynamic control system for performing longitudinal-motion control and/or roll-motion control.

Specifically, the present disclosure can be applied to a dynamic control system provided with a control platform arranged between each application for performing motion control of a controlled vehicle and a plurality of controlled objects to be controlled for performing motion control of the controlled vehicle. In this application, the lateral-motion control system is configured such that the control platform optimally controls one or more controlled objects based on a total target value for each of the applications.

For example, as the controlled objects for longitudinal-motion control, braking and drive power (engine output and/or motor output) can be used. As the controlled objects for roll-motion control, suspension and/or output of an active stabilizer can be used. In each of the first to third embodiments, the ACTs 13 to 16 are used to control the controlled objects as an example, but another ACT can be used to control a corresponding one of the controlled objects. For example, in each of the first to third embodiments, control of braking is performed by the ESC-ACT 19, but can be performed by a parking brake ACT, or an actuator for controlling an in-wheel motor installed in each wheel by controlling the torque of each of the front axle and rear axle.

In each of the embodiment and its application examples, at least one control parameter whose controllable range is to be computed by the controllable range computer 5 is physically identical to at least one control parameter whose application request value (total target value) is inputted to the comparator 8. This makes it possible to easily compare the application request value for the at least one control parameter with the controllable range of the corresponding at least one control parameter. However, if at least one control parameter whose controllable range is to be computed by the controllable range computer 5 is physically different from at least one control parameter whose application request value (total target value) is inputted to the comparator 8, the controllable range of the at least one control parameter and the application request value (total target value) of the at least one control parameter are converted into a controllable range of the at least one control parameter and an application request value (a total target value) of the same control parameter, and the comparison between the controllable range of the at least one control parameter and the application request value (total target value) of the same control parameter is performed.

While illustrative embodiment of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A vehicle dynamic control platform for controlling lateral movement of a vehicle comprising:
a controller arranged between a controlled object and an application, the controller designed to control the controlled object according to a target value of a first parameter associated with motion of the vehicle as a control request from the application;
a controllable-range computer configured to obtain a controllable range of a second parameter of the controlled object, and to output the controllable range of the second parameter of the controlled object to the application, the application being programmed to output the target value of the first parameter based on the controllable range of the second parameter of the controlled object;
a comparator configured to compare the target value of the first parameter with the controllable range of the second parameter when the target value of the first parameter is outputted from the application, and determine, based on a result of the comparison, whether to perform dynamic control of the vehicle by controlling the controlled object; and
a monitor configured to monitor current conditions of the vehicle, wherein the controllable-range computer is configured to:
receive vehicle information indicative of the current conditions of the vehicle from the monitor,
limit, based on the vehicle information, the controllable range of the second parameter of the controlled object to generate a limited controllable range of the second parameter of the controlled object, and
output, to the comparator, the controllable range of the second parameter of the controlled object as a first controllable range of the second parameter of the controlled object and the limited controllable range of the second parameter of the controlled object as a second controllable range of the second parameter of the controlled object, and
the comparator is configured to compare the target value of the first parameter with each of the first controllable range of the second parameter and the second controllable range of the second parameter.

2. The vehicle dynamic control platform according to claim 1, wherein the comparator is configured to transmit, to the application, information indicative of a result of the determination of whether to perform dynamic control of the vehicle.

3. The vehicle dynamic control platform according to claim 1, further comprising a notifying device for notifying information to a driver of the vehicle,
wherein the comparator is configured to transmit, to the notifying device, information indicative of a result of the determination of whether to perform dynamic control of the vehicle, and the notifying device is configured to receive the information indicative of the result of the determination of whether to perform dynamic control of the vehicle, and notify the driver of the information indicative of the result of the determination of whether to perform dynamic control of the vehicle.

4. The vehicle dynamic control platform according to claim 1, wherein the comparator is configured to:
determine whether the target value of the first parameter is within one of a first area, a second area, and a third area, the first area being within the second controllable range of the second parameter, the second area being beyond the second controllable range of the second parameter and within the first controllable range of the second parameter, the third area being beyond the first controllable range of the second parameter; and
determine whether to perform dynamic control of the vehicle by controlling the controlled object according to the determined one of the first to third ranges.

5. The vehicle dynamic control platform according to claim 4, wherein the comparator is configured to:
determine to perform dynamic control of the vehicle by controlling the controlled object if the target value of the first parameter is within the first area; and
determine to disable dynamic control of the vehicle by controlling the controlled object if the target value of the first parameter is within the third area.

6. The vehicle dynamic control platform according to claim 5, further comprising a notifying device for notifying information to a driver of the vehicle,
wherein the comparator is configured to determine to perform dynamic control of the vehicle by controlling the controlled object with caution, and transmits, to the notifying device, information representing that dynamic control of the vehicle is performed with caution.

7. The vehicle dynamic control platform according to claim 5, wherein the comparator is configured to determine to disable dynamic control of the vehicle by controlling the controlled object if the target value of the first parameter within the third area is continued for a preset time or more.

8. The vehicle dynamic control platform according to claim 5, wherein the comparator is configured to operate in a limp-home mode to disable dynamic control of the vehicle via the controlled object.

9. The vehicle dynamic control platform according to claim 1, wherein the second parameter includes a controlled variable and a change in the controlled variable of the controlled object, and the controllable-range computer is configured to obtain, as a first controllable range, the controllable range of the controlled variable of the controlled object, obtain, as a second controllable range, the controllable range of the change in the controlled variable of the controlled object, and output the first controllable range of the controlled variable of the controlled object and the second controllable range of the change in the controlled variable of the controlled objects to the application.

10. A vehicle dynamic control system comprising:
the vehicle dynamic control platform recited in claim 1;
a control requester including the application recited in claim 1; and
the controlled object recited in claim 1.

11. The vehicle dynamic control platform according to claim 1, wherein the controller receives the control request from the application and controls the controlled object according to the target value.

* * * * *